United States Patent
Heseding et al.

(10) Patent No.: US 12,202,379 B2
(45) Date of Patent: Jan. 21, 2025

(54) METHOD FOR OPERATING A TRAILER VEHICLE HAVING AN ELECTRIC DRIVE AND FRICTION BRAKES, AS WELL AS TRAILER BRAKE CONTROL UNIT AND TRAILER VEHICLE FOR CARRYING OUT THE METHOD

(71) Applicant: ZF CV Systems Global GmbH, Bern (CH)

(72) Inventors: Johannes Heseding, Hannover (DE); Felix Müller-Deile, Hannover (DE); Alexander Rodenberg, Braunschweig (DE); Michael Schomburg, Barsinghausen (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/745,687

(22) Filed: Jun. 17, 2024

(65) Prior Publication Data
US 2024/0336146 A1 Oct. 10, 2024

Related U.S. Application Data

(63) Continuation of application No. PCT/EP2022/083215, filed on Nov. 25, 2022.

(30) Foreign Application Priority Data

Dec. 17, 2021 (DE) ...................... 10 2021 133 759.3

(51) Int. Cl.
*B60L 7/26* (2006.01)
*B60L 15/20* (2006.01)

(52) U.S. Cl.
CPC .............. *B60L 7/26* (2013.01); *B60L 15/2009* (2013.01); *B60L 2200/28* (2013.01);
(Continued)

(58) Field of Classification Search
CPC ..... B60L 15/2009; B60L 7/26; B60L 2240/16
See application file for complete search history.

(56) References Cited

U.S. PATENT DOCUMENTS

| 1,870,469 | A | * | 8/1932 | Shepard | .................... B60L 3/10 105/49 |
| 2018/0236994 | A1 | | 8/2018 | Healy et al. | |

(Continued)

FOREIGN PATENT DOCUMENTS

DE 10 2019 119 786 A1 1/2021
DE 10 2020 108 391 A1 9/2021
(Continued)

OTHER PUBLICATIONS

International Search Report of the European Patent Office dated Mar. 13, 2023 for international application PCT/EP2022/083215 on which this application is based.

(Continued)

*Primary Examiner* — Stacey A Fluhart
(74) *Attorney, Agent, or Firm* — Walter Ottesen, P.A.

(57) ABSTRACT

A method is for operating a trailer vehicle having an electric drive and friction brakes. The method includes determining a differential mass between a first mass of a driven axle of the trailer vehicle and a second mass of a non-driven axle of the trailer vehicle, and determining a deceleration torque depending on the differential mass. The method further includes generating at least or exactly the determined deceleration torque with the electric drive when the friction brakes are activated. A trailer brake control unit is for the trailer vehicle. The trailer vehicle includes the trailer brake control unit. A combination includes a towing vehicle and a trailer vehicle having the trailer brake control unit.

14 Claims, 1 Drawing Sheet

(52) U.S. Cl.
CPC ....... *B60L 2240/14* (2013.01); *B60L 2240/26* (2013.01); *B60L 2240/46* (2013.01); *B60L 2240/465* (2013.01); *B60L 2240/642* (2013.01)

(56) References Cited

U.S. PATENT DOCUMENTS

| | | | |
|---|---|---|---|
| 2021/0053448 A1* | 2/2021 | Beck .................... | B60W 50/00 |
| 2022/0135041 A1 | 5/2022 | Heseding et al. | |
| 2023/0020585 A1 | 1/2023 | Flaum et al. | |
| 2023/0126354 A1* | 4/2023 | Kim ................... | B60L 15/2009 |
| | | | 701/22 |
| 2023/0364999 A1* | 11/2023 | Pettersson ............... | B60L 3/108 |
| 2024/0109423 A1* | 4/2024 | Sujan ....................... | B60L 7/16 |

FOREIGN PATENT DOCUMENTS

| | | |
|---|---|---|
| DE | 102022116596 A1 * | 1/2024 |
| EP | 2 172 378 A1 | 4/2010 |
| EP | 3 381 774 A1 | 10/2018 |
| GB | 2 565 851 A | 2/2019 |

OTHER PUBLICATIONS

English translation and Written Opinion of the International Searching Authority dated Mar. 13, 2023 for international application PCT/EP2022/083215 on which this application is based.

* cited by examiner

METHOD FOR OPERATING A TRAILER VEHICLE HAVING AN ELECTRIC DRIVE AND FRICTION BRAKES, AS WELL AS TRAILER BRAKE CONTROL UNIT AND TRAILER VEHICLE FOR CARRYING OUT THE METHOD

CROSS-REFERENCE TO RELATED APPLICATIONS

This application is a continuation application of international patent application PCT/EP2022/083215, filed Nov. 25, 2022, designating the United States and claiming priority from German application 10 2021 133 759.3, filed Dec. 17, 2021, and the entire content of both applications is incorporated herein by reference.

TECHNICAL FIELD

The disclosure relates to the field of commercial vehicles and, in this context, to trailer vehicles, or trailers for short, that are configured as commercial vehicles. A trailer vehicle configured as a commercial vehicle is towed by a towing vehicle which is also configured as a commercial vehicle, for example. Such trailer vehicles referred to herein are, in particular, semi-trailers and drawbar trailers.

BACKGROUND

According to the prior art, commercial vehicles that are configured as towing vehicles are primarily equipped with an internal combustion engine to drive the towing vehicle and possibly tow a trailer vehicle. According to the prior art, these commercial vehicles are increasingly being equipped with an electric drive. Accordingly, an electric drive can be provided in addition to the internal combustion engine in the towing vehicle, so that the towing vehicle is configured as a hybrid vehicle. It is additionally also known that an electric drive is arranged in the trailer vehicle to form a hybrid combination of towing vehicle and trailer vehicle.

Regardless of whether an electric drive is arranged in the towing vehicle, in the trailer vehicle or in both vehicles of a combination, the electric drive is primarily used to support the internal combustion engine, namely in order to be able to operate the internal combustion engine of the towing vehicle in an energy-efficient speed range or to provide additional thrust, for example when pulling away or driving uphill. The electric drive can additionally be used to recover kinetic and potential energy from the towing vehicle and trailer combination, for example during braking, and to store it as electrical energy in one or more energy storage units. This energy can be made available again for propulsion when required. In this way, an electric drive is also used to support or fully implement a required negative acceleration, specifically for braking. This is a particularly advantageous way of protecting the friction brakes of the towing vehicle and the trailer vehicle.

Compared to trailer vehicles without an electric drive, however, electric drives in the trailer vehicle not only lead to changes in behavior directly attributable to the electric drive, but also to an overall change in the behavior of the trailer vehicle, especially when braking. An electric drive, which usually only acts on one axle in trailer vehicles, leads specifically to an additional weight due to the electric drive, which is located substantially in the region of the electrically driven axle. Despite the fact that a trailer vehicle is usually evenly loaded, this results in an imbalance of the masses acting on the wheels. Depending on the type of braking, specifically whether braking is carried out with an electric drive or with friction brakes or a combination, either the wheels of the driven axle or the wheels of the non-driven axle tend to lock more than the other wheels.

This means that the electric drive is usually preferred for braking and the friction brakes are only used when there is a greater need for braking. Since the electrically driven axle also has friction brakes and all friction brakes are usually actuated with an identical brake pressure, the wheels of the driven axle lock by summing up the braking effect of the electric drive and the friction brakes before the non-driven wheels. For this reason, it is known to switch off the torque of the electric drive completely when the friction brakes are activated and to control deceleration solely by the friction brakes in the case of the above-mentioned stronger braking requirements. If the friction brakes apply the same braking force to all wheels, the wheels acted on with a lower mass will lock earlier than the wheels acted on with a comparatively higher mass. This behavior is particularly problematic because speed sensors, which can detect wheel locking, are often not arranged on each wheel or axle for cost reasons and in order to reduce complexity. This means that the locking of a wheel, which must be responded to in order to maintain vehicle stability, is only detected if the wheel has a sensor. If the weight distribution in the trailer vehicle is even, this is not a problem, as all wheels behave the same or very similarly anyway. However, if the weight is unevenly distributed due to the mass of the electric drive, a locking drive wheel would only be detected very late if sensors were only located on the non-driven axle, which could lead to stability problems.

SUMMARY

It is an object of the present disclosure to counter the problems of the prior art. In particular, stability, in particular in the event of one of the wheels locking, is to be improved and/or tire wear reduced with as little additional effort as possible in trailer vehicles of the above-mentioned type. In any case, it is the object of the present disclosure to find an alternative to the prior art.

The aforementioned object is, for example, achieved via a method for operating a trailer vehicle having an electric drive and friction brakes. The method includes: determining a differential mass between a first mass of a driven axle of the trailer vehicle and a second mass of a non-driven axle of the trailer vehicle; determining a deceleration torque depending on the differential mass; and, generating at least or exactly the determined deceleration torque with the electric drive when the friction brakes are activated.

The method is used to operate a trailer vehicle that has an electric drive and friction brakes. The method initially includes determining a differential mass between a first mass of the driven axle of the trailer vehicle and a second mass of the non-driven axle of the trailer vehicle. Here, the first mass and the second mass each denote the masses of the corresponding axle itself, without including a mass acting on the axle, for example due to a chassis or a load. A deceleration torque is then determined depending on the differential mass and at least, in particular exactly, the determined deceleration torque is generated on the driven axle with the electric drive when the friction brakes of the trailer vehicle are activated. Activation of the friction brakes here includes, on the one hand, building up and also maintaining brake pressure at the friction brakes. In contrast to this, the term "deactivation" of the friction brakes is also used in the following, which includes releasing brake pressure at the friction brakes or retracting electronic actuators of the friction brakes.

By determining the differential mass and the resulting deceleration torque, which is then applied to the driven axle with the electric drive, a type of compensating torque is provided by the electric drive. This compensating torque means that driven and non-driven axles behave almost identically if the friction brake is triggered and a slip change is caused as a result.

The method is based on the finding that in the case of heavy braking, when an anti-lock braking system intervenes, an electric drive usually reduces its torque immediately to zero in order to enable the anti-lock braking system to actuate the braking process without the influence of the electric drive by actuating all friction brakes, wherein the mass of the electric drive acting on the driven wheels is usually not taken into account and this leads to a non-ideal actuation of the friction brakes by the anti-lock braking system. The determined differential mass, which corresponds to an additional mass of the driven axle generated by the electric drive compared to a non-driven axle, is now used for consideration when braking.

With the present disclosure, the identical behavior of all wheels in the event of a slip change due to the use of friction brakes also makes it possible to use a small number of speed sensors on the wheels. A speed change of one wheel is fundamentally representative of a speed change of all wheels. This also eliminates the need to individually actuate each friction brake on each individual wheel, so that the two, previously routine, separate actuations for the left-hand side of the trailer vehicle and the right-hand side of the trailer vehicle can still be used to improve behavior during heavy braking.

According to a first embodiment, the deceleration torque determined is generated during a braking and/or pressure-holding phase generated by an anti-lock braking system.

An anti-lock braking system, which is referred to below as ABS for short and is sometimes also referred to as an "ABS system", usually responds when a wheel of the trailer vehicle locks. This locking of the wheel is detected by a wheel speed sensor. Locking is assumed either when the wheel speed drops completely to zero or when a speed gradient changes discontinuously.

If a locking wheel is detected, the ABS greatly reduces the brake pressure in order to release the locking wheel. After reduction and thus release of the wheel, the brake pressure is increased again, and this increase in brake pressure can be described as the braking phase of the ABS. By contrast, reducing the brake pressure can be referred to as the bleeding phase of the ABS. When the brake pressure is increased, it is usually raised in stages and kept constant for short periods of time in order to detect any new locking of the wheels. This holding of the pressure can also be referred to as the pressure-holding phase, wherein the pressure-holding phase can lie within the braking phase. The deceleration torque determined is therefore generated at least when an ABS activates the wheel brakes during the braking and/or pressure-holding phases in order to enable the wheels to behave in the same way despite the different weights of the axles, especially here when, specifically, the friction brakes are activated.

According to a further embodiment, the deceleration torque is reduced during a bleeding phase of the ABS and, in the event that a new braking and/or pressure-holding phase is generated by the ABS, the determined deceleration torque is applied again. This enables rapid rolling of all wheels after locking, in particular also rolling of the wheels of the driven axle after locking.

According to a further embodiment, the deceleration torque is determined depending on the differential mass, the acceleration due to gravity and a dynamic tire radius. The dynamic tire radius preferably corresponds to the height of a loaded wheel between the contact area and the center of the wheel. This is determined, for example, by loading the trailer vehicle before driving off.

The determined deceleration torque per wheel ($M_{rad}$) can be determined using the following formula:

$$M_{rad} = \frac{m_{Achse}}{2} \cdot g \cdot r_{dyn}$$

$M_{rad}$ denotes the torque of the motor on one wheel of the driven axle in Nm and $m_{Achse}$ the additional mass of the electric drive on the driven axle in kg, that is, the differential mass. Furthermore, g corresponds to the acceleration due to gravity in m/s$^2$ and $r_{dyn}$ corresponds to the dynamic tire radius in m.

According to a further embodiment, the deceleration torque is determined depending on the differential mass, the acceleration due to gravity, a dynamic tire radius and an inclination of the trailer vehicle, in particular a rotation of the trailer vehicle about a longitudinal axis and/or a transverse axis of the trailer vehicle relative to a horizontal alignment of the trailer vehicle.

The determined deceleration torque per wheel ($M_{rad}$) can be determined using the following formula:

$$M_{rad} = \frac{m_{Achse}}{2} \cdot g \cdot \cos(\varphi) \cdot r_{dyn}$$

$M_{rad}$, $M_{Achse}$, g and $r_{dyn}$ are used as above. The variable $\varphi$ denotes an angle and corresponds to an inclination of the trailer vehicle due to an inclination of the roadway on which the trailer vehicle is positioned. The inclination or road inclination can preferably be determined here with an inclination sensor of the trailer vehicle or a sensor from the sensor signal of which an inclination of the trailer vehicle can be derived.

By taking into account not only the differential mass, but also optionally the inclination of the trailer vehicle, and by taking into account the dynamic tire radius, the calculation of the deceleration torque can be determined even more precisely. In this way, the behavior of the trailer vehicle during heavy braking is influenced even more precisely in order to further reduce wear on the tires of the trailer vehicle and improve the stability of the trailer vehicle.

According to the aforementioned formula, a distinction must be made as to whether the deceleration torque is determined for both wheels of an axle or for one wheel of an axle. In the case of the formulas listed, the deceleration torque is therefore determined for one of the wheels of the driven axle in each case. This is advantageous if the electric drive includes a plurality of electric motors, each of which drives one wheel. If, on the other hand, a central axle motor is provided, which drives two or more wheels, and the deceleration torque is determined for the central axle motor, that is, for two or more wheels, the deceleration torque is preferably determined by one of the aforementioned formulas, with the division by two being omitted.

According to a further embodiment, a propulsion torque is generated with the electric drive after a locking wheel is detected, in particular at the start of the bleeding phase or even before, specifically immediately after the locking is detected. The propulsion torque is generated until the wheel is no longer locked or the friction brakes are reactivated. This improves the dynamics of the trailer vehicle, as restarting the driven wheels is accelerated, for example during a bleeding phase. A sluggish reaction of the friction brake, which, for example, requires a certain amount of time after deactivation until sufficient air has been released to free the locking wheel again, is counteracted by generating a force with the electric drive to restart the wheel. Despite the braking torque of the friction brakes still being present, a quick restart is thus possible.

According to a further embodiment of the method, the trailer vehicle includes an air suspension system, in particular an electronic air suspension system, in which each of the wheels is suspended via an air bellows. By controlling the air suspension system, the pressure in the air bellows can be controlled depending on the load of the trailer vehicle. At the same time, sensors can be used to measure the air pressure in the air bellows, which in turn can be used to determine the mass of the trailer vehicle. Accordingly, to determine the partial masses acting on the axles, the air pressure in the corresponding air bellows is measured and the partial masses acting on the axles are added together to form a total mass of the trailer vehicle. In this way, the mass of the trailer vehicle can be easily determined at any time.

According to a further embodiment, the trailer vehicle includes a trailer brake control unit. The trailer brake control unit preferably receives the partial masses from the air suspension system in order to determine a total mass of the trailer vehicle. Alternatively, the trailer brake control unit receives the total mass of the trailer vehicle already determined by the air suspension system from the partial masses. The trailer brake control unit is used to actuate the friction brakes and the electric drive. Accordingly, at least the differential mass is retrieved with the trailer brake control unit or determined from data provided to the trailer brake control unit. In particular, the trailer brake control unit also includes an anti-lock braking system. This means that the friction brakes can be actuated and the electric drive actuated centrally in a single control unit, so that coordination, in particular when an anti-lock braking system intervenes, is made possible quickly by central data processing without the need for a delaying data communication between individual control units.

The disclosure also relates to a trailer brake control unit which is set up to carry out the method according to one of the aforementioned embodiments.

According to an embodiment, the trailer brake control unit includes an anti-lock braking system and is used to actuate the friction brakes of the trailer vehicle and the electric drive of the trailer vehicle.

The disclosure also relates to a trailer vehicle with an embodiment of the aforementioned trailer brake control unit.

According to an embodiment, the trailer vehicle includes an electric drive and friction brakes.

According to a further embodiment, the trailer vehicle includes an air suspension system, in particular an electronic air suspension system.

The disclosure additionally relates to a combination including an embodiment of the aforementioned trailer vehicle and a towing vehicle

BRIEF DESCRIPTION OF DRAWINGS

The invention will now be described with reference to the drawings wherein.

DETAILED DESCRIPTION

Figure 1:
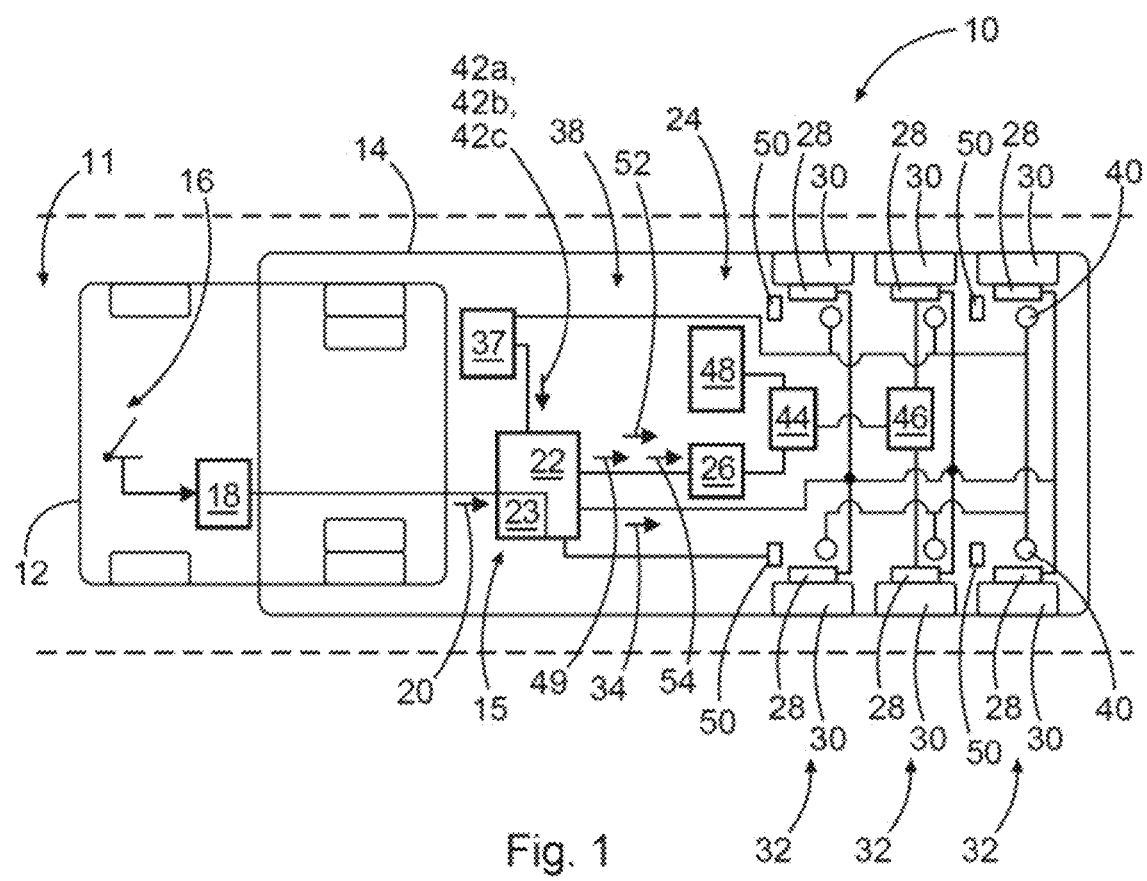
FIG. 1 shows a towing vehicle and trailer combination.

FIG. 1 shows a combination 10 on a roadway 11. The combination 10 includes a towing vehicle 12 and a trailer vehicle 14 with a braking system 15. A brake pedal 16 is arranged in the towing vehicle 12, via which brake pedal a braking request 20 can be generated by a driver. The braking request 20 is sent to a brake control unit (EBS) 18 of the towing vehicle 12. The braking request 20 is then forwarded unchanged or adapted from the brake control unit 18 to a trailer brake control unit (TEBS) 22. The trailer brake control unit 22 has an anti-lock braking system 23 in order to reduce the period of time during which the wheels 30 of the trailer vehicle 14 lock in the event of heavy braking.

Accordingly, the braking request 20 is converted by the brake control unit 18 of the towing vehicle 12 into a brake pressure 34 for actuating friction brakes, not shown, of the towing vehicle 12 and, depending on the type of braking request 20, the braking request 20 itself or a braking request 20 which is generated by the brake control unit 18 of the towing vehicle 12 for the trailer brake control unit 22 is transmitted to the trailer brake control unit 22 of the trailer vehicle 14. The trailer brake control unit 22 controls an electric drive 24 depending on the braking request 20, in that the braking request 20 is also transmitted to a control unit 26 of the electric drive 24. In a further embodiment not shown here, but which is also covered by the disclosure, the control unit 26 of the electric drive 24 is a component of the trailer brake control unit 22. Depending on the braking request 20, friction brakes 28 are also actuated, which are arranged on each wheel 30 of the axles 32 of the trailer vehicle 14. This is done by forwarding a brake pressure 34 to actuate the friction brakes 28.

In order to generate a suitable braking force in the form of the brake pressure 34 by the trailer brake control unit 22 depending on the braking request 20, a control unit 37 of an air suspension system, shown here as an electronic air suspension system (ECAS) 38, supplies the trailer brake control unit 22 with data corresponding to partial masses 42a, 42b, 42c which act on the individual axles 32 or the individual wheels 30 of the trailer vehicle 14. According to an alternative embodiment of the disclosure, not shown in the figures, all the features of FIG. 1 are included, although, in deviation from FIG. 1, the air suspension system 38 is integrated into the trailer brake control unit 22. Thus, alternatively, the brake pressure 34 is also measured directly in the trailer brake control unit 22 and the partial masses 42a, 42b, 42c are determined accordingly in the trailer brake control unit 22 without an independent control unit 37 of the air suspension system 38.

In the trailer brake control unit 22, a total mass of the trailer vehicle 14 can be determined from these partial masses 42a, 42b, 42c. The partial masses 42a, 42b, 42c are determined in the control unit 37 of the electronic air suspension system 38 by measuring pressure values of air bellows 40 arranged on each of the wheels 30 and deriving the partial masses 42a, 42b, 42c of the trailer vehicle 14 from this. According to an alternative embodiment not shown in the figures, substantially all the features of FIG. 1 are included, with the exception that, in contrast to FIG. 1, only one sensor is provided in one of the air bellows for measuring a total mass.

In addition to the control unit 26 for the electric drive 24, the electric drive 24 has an inverter 44 which, depending on the control with the control unit 26, supplies an electric motor 46, which is here a central axle motor, with energy from a battery 48 in order to drive the wheels 30 of the axle 32, which are connected to the electric motor 46. For braking, the inverter 44 is controlled so that electrical energy flows into the battery 48 in a regenerative operation of the electric motor 46. According to this embodiment, the control unit 26 of the electric drive receives actuation signals from the trailer brake control unit 22 in order to operate the electric drive 24. Information 49 from the trailer brake control unit 22 is fed to the control unit 26 of the electric drive 24 to control the inverter 44. The control unit 26 of the electric drive 24 or the trailer brake control unit 22 also determine a wheel speed of the wheels 30 of the electrically driven axle 32 depending on the speed of the electric motor 46 or depending on wheel speed sensors 50, which are shown here only on the non-driven wheels 30. From this, a slip can be determined with the control unit 26 or the trailer brake control unit 22, so that locking wheels can be detected. In addition, the trailer brake control unit 22 can be used to determine a deceleration torque 54 in order to operate the electric drive 24 during the braking and/or pressure-holding phases in regenerative mode, also known as recuperation mode, during braking performed by the anti-lock braking system 23.

Figure 2:
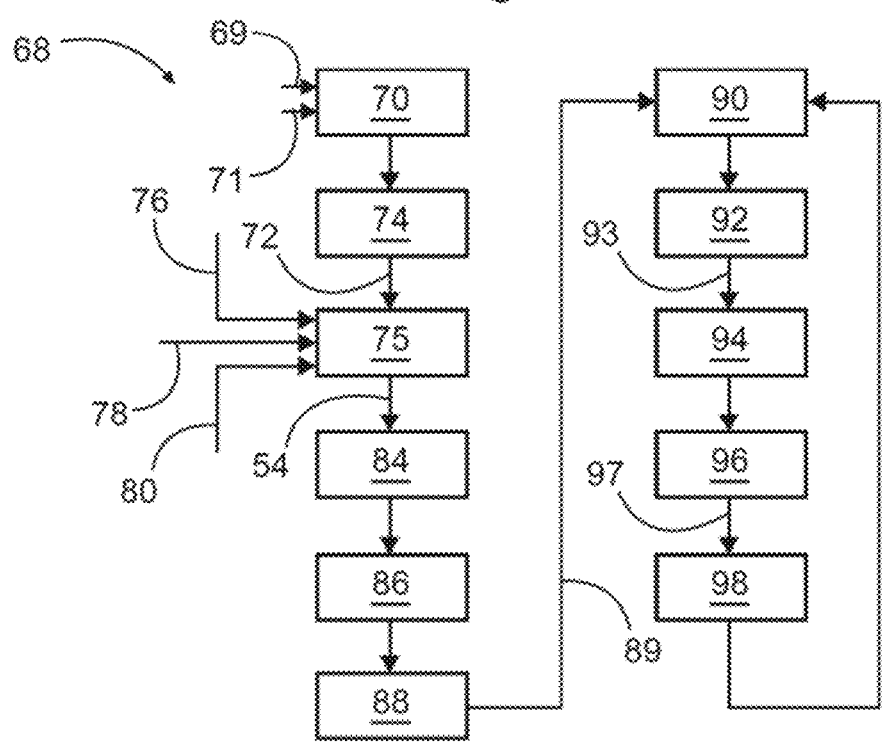
FIG. 2 shows the steps of the method according to an embodiment.

FIG. 2 shows steps of an embodiment of the method 68. In a step 70, a first mass 69 of a driven axle 32 and a second mass 71 of a non-driven axle 32 of the trailer vehicle 14 are determined by the trailer brake control unit 22, for example retrieved from a memory. Based on the first mass 69 and the second mass 71, a differential mass 72 is determined in step 74. The differential mass 72 corresponds to the mass which acts more on the wheels 30 of the central axle 32 shown in FIG. 1 than on the wheels 30 of the other axles 32 due to the weight of the electric drive 24, in particular the electric motor 46. In step 75, further values, such as the acceleration due to gravity 76 and the dynamic tire radius 78 as well as an inclination 80 exhibited by the trailer vehicle, are retrieved in order to also determine the deceleration torque 54 in this step 75.

If locking of one of the wheels 30 is now detected in step 84 during a braking request 20, ABS braking is triggered in step 86. For this purpose, the pressures 34 at the friction brakes 28 are reduced in step 88. In step 90, as soon as the wheels 30 start up again, the electric drive 24 is used to generate braking with the deceleration torque 54. At the same time, the friction brakes 28 are activated in step 92. As soon as a new locking of the wheels 30 is detected in step 94, a propulsion torque 97 is generated with the electric drive 24 in step 96 and the friction brakes 28 are simultaneously released again in step 98. Step 90 then follows again and the subsequent steps are repeated until the braking request 20 has been canceled by the driver or the towing vehicle and trailer combination 10 has come to a standstill.

It is understood that the foregoing description is that of the preferred embodiments of the invention and that various changes and modifications may be made thereto without departing from the spirit and scope of the invention as defined in the appended claims.

List of Reference Signs [Part of the Description]

10 combination
11 roadway
12 towing vehicle
14 trailer vehicle
15 braking system
16 brake pedal
18 brake control unit (EBS)
20 braking request
22 trailer brake control unit (TEBS)
23 anti-lock braking system
24 electric drive
26 control unit
28 friction brakes
30 wheels
32 axles
34 brake pressure
37 control unit
38 electronic air suspension system (ECAS)
40 air bellows
42a partial mass
42b partial mass
42c partial mass
44 inverter
46 electric motor
48 battery
49 information
50 wheel speed sensor
54 deceleration torque
68 method
69 first mass
70 receipt of partial masses
71 second mass
72 differential mass
74 determination of differential mass
75 retrieval of further values and determination of deceleration torque
76 acceleration due to gravity
78 dynamic tire radius
80 inclination of the trailer vehicle
84 detection of wheel locking
86 triggering of ABS braking
88 reduction of friction brake pressures
89 bleeding phase
90 generation of braking
92 activation of friction brakes
93 braking and/or pressure-holding phase
94 further detection of wheel locking
96 generation of propulsion torque
97 propulsion torque
98 release of friction brakes

The invention claimed is:

1. A method for operating a trailer vehicle having an electric drive and friction brakes, the method comprising:
   determining a differential mass between a first mass of a driven axle of the trailer vehicle and a second mass of a non-driven axle of the trailer vehicle;
   determining a deceleration torque depending on the differential mass; and,
   generating at least or exactly the determined deceleration torque with the electric drive when the friction brakes are activated.

2. The method of claim 1, wherein the determined deceleration torque is generated during at least one of a braking phase and a pressure-holding phase generated by an anti-lock braking system.

3. The method of claim 1 further comprising:
   reducing the deceleration torque during a bleeding phase; and, in an event that at least one of a new braking phase and a pressure-holding phase is generated by an anti-lock braking system, generating the deceleration torque again.

4. The method of claim 1, wherein the deceleration torque is determined in dependence upon the differential mass, an acceleration due to gravity, and a dynamic tire radius.

5. The method of claim 1, wherein the deceleration torque is determined in dependence upon the differential mass, an acceleration due to gravity, a dynamic tire radius, and, an inclination of the trailer vehicle.

6. The method of claim 1, further comprising:
detecting a locking wheel driven by the electric drive; and,
generating, when the locking wheel driven by the electric drive is detected, a propulsion torque until the wheel is no longer locked or the friction brakes are activated again.

7. The method of claim 1, wherein said generating the determined deceleration torque with the electric drive is performed via an actuation of the electric drive by a trailer brake control unit.

8. A trailer brake control unit comprising:
a non-transitory computer readable storage medium having program code stored thereon;
a processor;
said program code being configured, when executed by said processor, to:
determine a differential mass between a first mass of a driven axle of a trailer vehicle and a second mass of a non-driven axle of the trailer vehicle;
determine a deceleration torque depending on the differential mass; and,
generate at least or exactly the determined deceleration torque with an electric drive when the friction brakes are activated.

9. The trailer brake control unit of claim 8, wherein said trailer brake control unit is configured to actuate the electric drive of the trailer vehicle.

10. A trailer vehicle comprising:
a trailer brake control unit including a non-transitory computer readable storage medium having program code stored thereon;
said trailer brake control unit further including a processor;
said program code being configured, when executed by said processor, to:
determine a differential mass between a first mass of a driven axle of the trailer vehicle and a second mass of a non-driven axle of the trailer vehicle;
determine a deceleration torque depending on the differential mass; and,
generate at least or exactly the determined deceleration torque with an electric drive when friction brakes are activated.

11. The trailer vehicle of claim 10, wherein the trailer vehicle includes the electric drive and the friction brakes.

12. The trailer vehicle of claim 11, further comprising an air suspension system.

13. The trailer vehicle of claim 12, wherein the air suspension system is an electronic air suspension system.

14. A combination comprising a towing vehicle and the trailer vehicle of claim 10.

* * * * *